Figure 7:
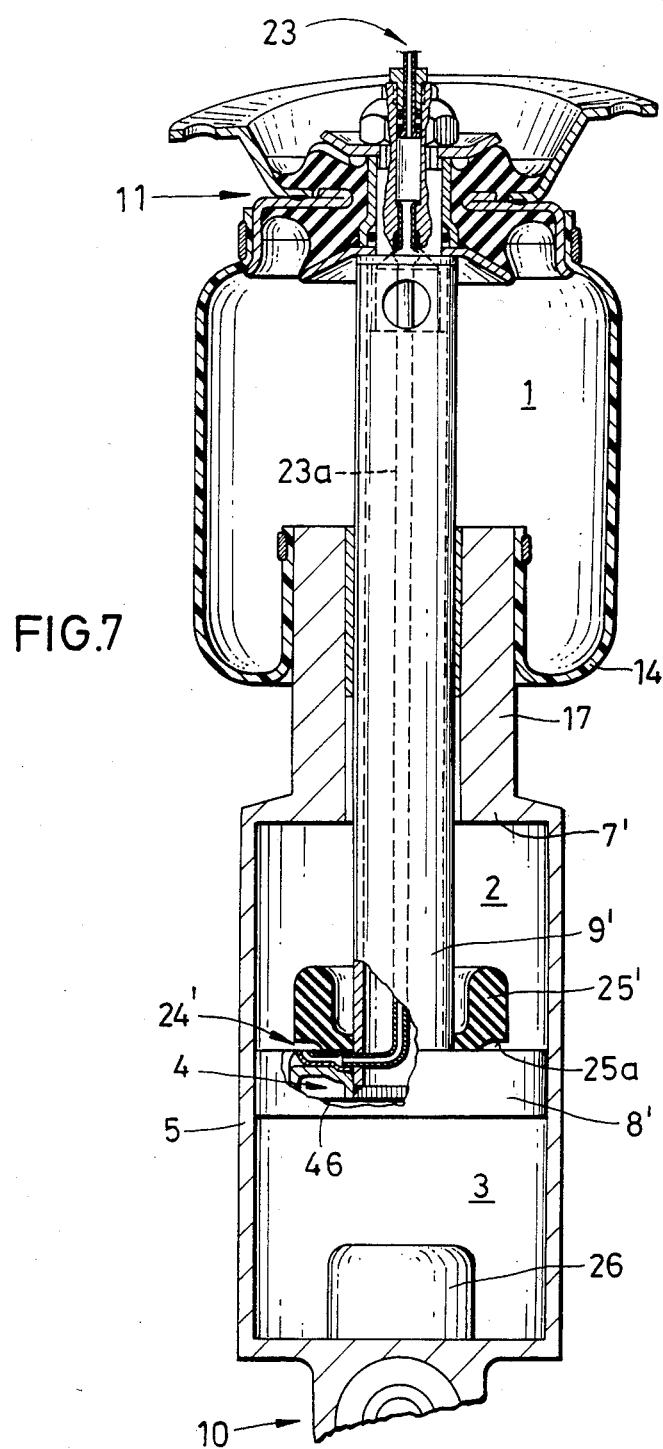

United States Patent [19]

Gold

[11] Patent Number: 4,647,025
[45] Date of Patent: Mar. 3, 1987

[54] SPRING-LOADED DAMPING OR SHOCK ABSORBING APPARATUS

[76] Inventor: Henning Gold, Im Rheinblick 29, 6530 Bingen 1, Fed. Rep. of Germany

[21] Appl. No.: 728,618

[22] Filed: Apr. 29, 1985

[30] Foreign Application Priority Data

Apr. 30, 1984 [DE] Fed. Rep. of Germany ... 8413300[U]

[51] Int. Cl.4 .......................... B60G 17/04; F16F 9/02; F16F 9/34
[52] U.S. Cl. .................... 267/64.27; 267/122; 267/124; 267/140
[58] Field of Search .......................... 267/64.11–64.28, 267/139–140, 8, 35, 122–129, 113, 120, 152, 153, 121; 188/284, 285, 298, 299, 312, 322.21, 322.22; 280/707, 711, 712, 713, 714, DIG. 1, 6 H; 180/41

[56] References Cited

U.S. PATENT DOCUMENTS

| | | | |
|---|---|---|---|
| 2,227,862 | 1/1941 | Redfield | 267/50 X |
| 2,592,391 | 4/1952 | Butterfield | 267/8 R |
| 2,624,592 | 1/1953 | MacPherson | 267/8 R |
| 2,660,449 | 11/1953 | MacPherson | 280/668 |
| 2,922,635 | 1/1960 | Delorean | 267/64.21 |
| 3,000,625 | 9/1961 | Polhemus | 267/64.24 |
| 3,164,225 | 1/1965 | Le Carbon | 188/320 |
| 3,178,167 | 4/1965 | Menar | 267/64.21 |
| 3,246,905 | 4/1966 | Morgan | 267/64.21 X |
| 3,256,961 | 6/1966 | Le Carbon | 188/317 |
| 3,312,312 | 4/1967 | Le Carbon | 188/317 |
| 3,353,813 | 11/1967 | Erdmann et al. | 267/8 R |
| 3,372,919 | 3/1968 | Jackson | 267/64.21 X |
| 3,376,032 | 4/1968 | Schmid | 267/8 R |
| 3,666,287 | 5/1972 | Wanner | 280/711 |
| 3,870,286 | 3/1975 | Willich | 267/8 R |
| 3,887,174 | 6/1975 | Whelan et al. | 267/64.19 X |
| 3,954,256 | 5/1976 | Keijzer et al. | 267/64.21 |
| 3,954,257 | 5/1976 | Keijzer et al. | 267/64.21 |
| 4,067,558 | 1/1978 | Keijzer et al. | 267/8 R |
| 4,150,299 | 4/1979 | Kasiewicz et al. | 267/64.21 X |
| 4,206,907 | 6/1980 | Harrod | 267/8 R |
| 4,211,429 | 7/1980 | Howard | 267/35 X |
| 4,256,292 | 3/1981 | Sullivan et al. | 267/8 R |
| 4,325,541 | 4/1982 | Korosladanyi et al. | 267/64.21 X |
| 4,335,750 | 6/1982 | Bauer et al. | 277/165 X |
| 4,383,595 | 5/1983 | Schnitzius | 267/120 X |
| 4,398,704 | 8/1983 | Buchanan, Jr. et al. | 267/64.21 |
| 4,434,977 | 3/1984 | Chiba et al. | 267/8 R |
| 4,462,608 | 7/1984 | Lederman | 267/8 R |
| 4,468,739 | 8/1984 | Woods et al. | 280/714 X |
| 4,531,759 | 7/1985 | Rezanka et al. | 267/8 R |
| 4,555,096 | 11/1985 | Pryor | 267/8 R |

FOREIGN PATENT DOCUMENTS

| | | | |
|---|---|---|---|
| 217855 | 2/1957 | Australia | 267/64.24 |
| 1535025 | 8/1968 | France | 188/317 |
| 1137219 | 12/1968 | United Kingdom | 188/320 |

Primary Examiner—Douglas C. Butler
Attorney, Agent, or Firm—Karl Hormann

[57] ABSTRACT

A pneumatic spring-loaded damping or shock absorbing apparatus provided with a venting port and a seal activated by a piston for automatically sealing the port when the apparatus approaches its fully expanded position for maintaining residual pressure within the apparatus.

12 Claims, 7 Drawing Figures

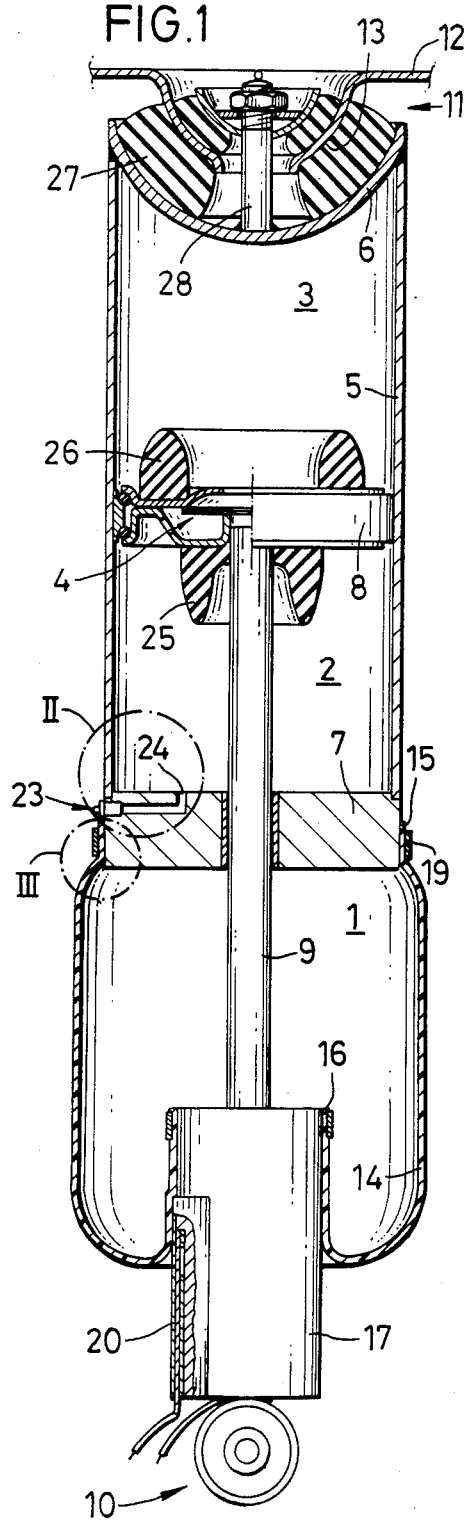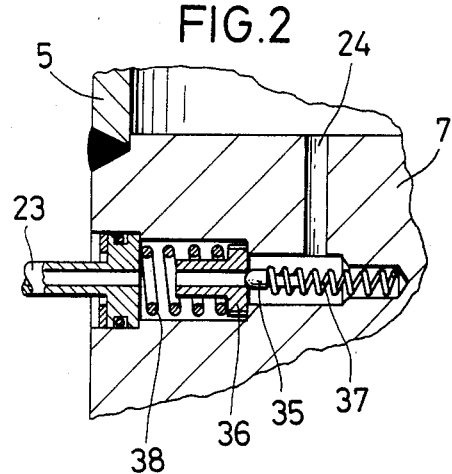

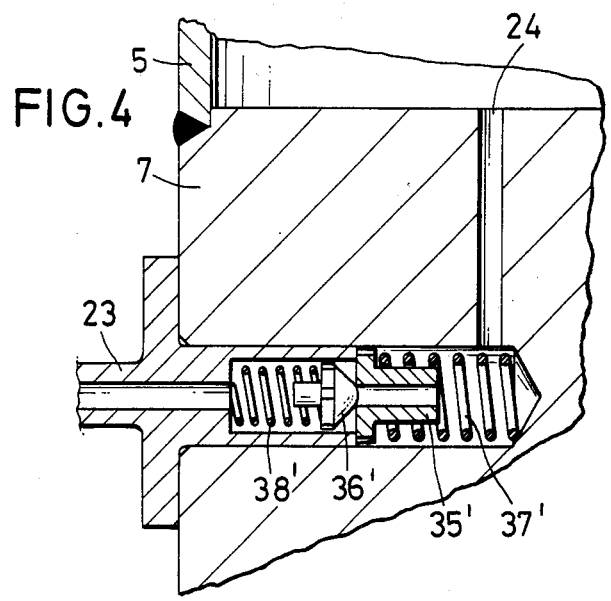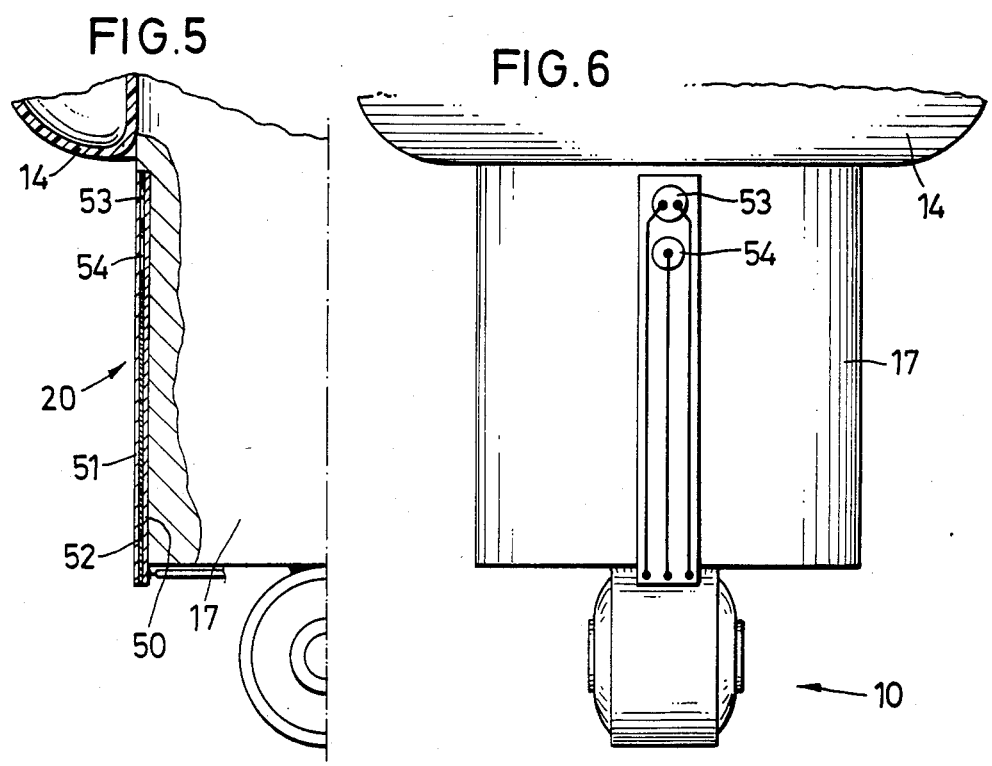

SPRING-LOADED DAMPING OR SHOCK ABSORBING APPARATUS

This application relates to copending U.S. application Ser. Nos. 728,565 and 728,270, filed on even date herewith.

The invention relates generally to a combination pneumatic spring and shock absorber. More particularly, the invention is directed to pneumatic apparatus combining and improving the hitherto usually separate functions of coil springs and shock absorbers used in automotive wheel suspension systems. Such apparatus are known to the trade as spring-loaded damping units.

Combination pneumatic spring and shock absorber apparatus of the kind here under consideration are generally known from the Applicant's dissertation which is on file at the Institut fur Kraftfahrwesen und Kolbenmaschinen der Rheinisch-Westfalischen Technischen Hochschule (Institute for Automotive Engineering and Piston Machines of the Rhenish-Westfalian Technical University) at Aachen, West Germany.

Typically, such an apparatus comprises a cylindrical housing having top and bottom closures and a first mounting bracket, a piston slidably supported within the housing for dividing the housing into shock absorbing chambers respectively increasing and decreasing in their volumes during compression (and vice versa during expansion), throttle means within the piston for flow of pressure in both directions between the two chambers, a piston rod affixed to the piston and slidably extending through the bottom closure and through a resilient chamber formed and sealed by a rolling bellows extending between the housing and the piston rod, the piston rod being provided with a second mounting bracket, and closable means for venting the housing.

The operativeness of the apparatus as regards both its spring function and its shock absorbing function is based substantially entirely upon pneumatic pressure. The center position of the piston within its housing is maintained substantially constant by adding or venting gas, preferably air. Thus, the spring and shock absorbing functions of the apparatus are automatically adjusted to substantially any load. This renders the apparatus particularly suited for vehicles of varying pay loads and assures comfortable spring action independently of any added loads. The device has a frequency selective shock absorbing characteristic and effectively absorbs resonant vibrations without generating large absorptive forces at hypercritical excitations.

It is an object of the present invention to provide for an improved pneumatic spring and shock absorbing apparatus.

A specific object of the invention resides in the provision of such an apparatus of simplified construction and improved performance.

Still another object resides in the provision of a pneumatic spring and shock absorbing apparatus requiring fewer parts in their assembly than the prior art devices.

Yet another object of the invention is to provide an integral spring and shock absorbing apparatus made of few light weight parts of simple structure.

It is also an object of the invention to provide for a pneumatic spring loaded damper apparatus being residually pressurized its total relief from weight not withstanding.

A more particular object of the invention is to provide for a pneumatic spring loaded damper apparatus which remains residually pressurized under the control of a level switch, the total relief of the apparatus from weight supported by it not withstanding.

In the accomplishment of these and other objects, the invention in a preferred embodiment thereof provides a novel pneumatic spring-loaded damping or shock absorbing apparatus of the kind referred to above in which the closable means for venting the housing comprises a conduit leading into the absorption chamber, the volume of which is reduced upon expansion of the apparatus and is arranged such that it is closed by means cooperating with the piston when the apparatus is expanded to its fullest extent.

Advantageously, the means cooperating with the piston comprises an annular abutment member which during maximum expansion of the apparatus is compressed between the piston and the housing in a position covering the conduit. Preferably, the conduit is located within the bottom closure of the housing. In an alternate embodiment of the invention, the conduit may be provided within the piston and may communicate with a duct within the piston rod. Preferably, the conduit and the duct may be formed by tubular members respectively located within the piston and the piston rod. In a particularly advantageous embodiment of the invention, the piston may be provided with annular abutments of elastomeric material on both of its surfaces. Furthermore, the absorption chamber, the volume of which increases during compression of the apparatus may advantageously be provided with an air intake conduit including an automatically opening intake valve. Preferably, intake and venting conduits comprise a common duct within which automatically opening intake and exhaust valves are seated in series. Air intake and venting are preferably controlled by circuitry activated by a pressure level switch provided in a sleeve mounted on the piston rod and responsive to the movement of the bellows attached thereto. In a preferred embodiment, the pressure level switch comprises an electrically conductive bar covered by an insulative strip of material having cutouts provided therein and an electrically conductive flexible member engageble by the bellows for contacting the bar through at least one cutout. The position of the cutouts is related to the pneumatic pressure within the apparatus.

Other objects and advantages of the invention will in part be obvious and will in part become apparent upon full consideration of the following description and attached drawing in which FIG. 1 is a view in longitudinal section of a pneumatic spring loaded damping or shock absorbing unit in accordance with the invention, FIG. 2 is an enlarged representation of section II of FIG. 1, FIG. 3 is an enlarged view of section III of FIG. 1, FIG. 4 is a view similar to FIG. 2 of an alternate embodiment of an air intake conduit, FIG. 5 is a view in enlarged longitudinal section of a pressure level switch, FIG. 6 is a planar view of the pressure level switch of FIG. 5, and FIG. 7 is a view in longitudinal section of a further embodiment of a pneumatic spring-loaded damping or shock absorbing apparatus in accordance with the invention.

As may be seen in FIG. 1, the pneumatic spring-loaded damping apparatus comprises a resilient compressible chamber 1 as well as two absorption chambers 2 and 3. During compression of the apparatus the volume of the resilient chamber 1 and of absorption chamber 3 is reduced whereas the volume of absorption chamber 2 is increased. Conversely, during expansion of the apparatus, the volume of chambers 1 and 3 is increased whereas the volume of absorbtion chamber 2 is reduced. The resilient chamber 1 is enclosed by a resilient rolling bellows 14, and the absorption or damping chambers 2 and 3 are located within a cylindrical housing 5. The chambers 2 and 3 are separated from each other by a piston 8 which is mounted for sliding movement within the housing 5. At one of its ends, the housing 5 is closed by an upper or top closure 6, and at its opposite end the housing 5 is closed by a bottom closure 7. The bottom closure 7 separates the resilient chamber 1 from the damping chamber 2. There is provided within the piston 8 a throttle means 4 permitting limited bidirectional exchange of pressure between the chambers 2 and 3. The piston 8 is provided with a piston rod 9 which extends through the chamber 2, a packing in the bottom closure 7 of the housing 5 and through the resilient chamber 1. A sleeve 17 is mounted at the free end of the piston rod 9. The sleeve 17, in turn, is provided with a mounting bracket 10. Another mounting bracket 11 is provided adjacent the upper closure 6 of the housing 5. The upper mounting bracket 11 may serve to connect to an element 13 of an automotive chassis 12, for instance, and the lower mounting bracket 10 may connect to an axle of an automotive vehicle.

The chamber 3 may communicate with the resilient chamber 1 by way of the tubular piston rod 9 and an opening (not shown) in the sleeve 17. Such a connection may be provided with or without throttle means and, to allow adjustments in the spring characteristics as well as the absorption characteristics, may advantageously be controllable by external means.

To form the resilient chamber 1, one end 15 of the resilient rolling bellows 14 is connected to the housing 5 adjacent the bottom closure 7 by means of a clamp 19 and the opposite end 16 of the resilient bellows 14 is connected to the sleeve 17. The connection between the bellows 14 and the sleeve 17 is such that during compression of the apparatus, i.e., when the volume of the chamber 1 is reduced, the bellows 14 rolls along the sleeve 17.

A pressure level switch 20 provides on the sleeve 17 serves to adjust the pneumatic pressure within the apparatus as a function of any load supported by the apparatus.

As may be seen in FIG. 3, the resilient bellows 14 is attached at its end 15 in an air-tight manner to a tenter surface 21 formed by the periphery of the bottom closure 7. The tenter surface 21 is of slightly conical configuration. At its larger lower end it is provided with an annular bulge 22 which prevents slippage of the bellows 14 from the surface 21. During assembly, the bellows 14 is pulled over the bulge 22 sufficiently far to provide a predetermined distance between the lower margin of the clamp 19 and the bulge 22. The clamp 19 preferably comprises a reinforced adhesive tape. When subjected to a load, the end 15 of the bellows 14 tends to slide toward the wider section of the conical tenter surface 21 so that the sealing action provided by the clamp 19 increases and assures a hermetic seal.

The upper surface of the piston 8 is provided with an elastic annular abutment member 26 which during maximum compression of the apparatus moves into engagement with the convexly curved upper closure 6 of the housing 5.

Pressure within the pneumatic spring-loaded damping apparatus may be changed by way of a pneumatic conduit 23 connected to the bottom closure 7 of the housing 5 and leading from a pump or pressure reservoir (not shown) into the damping chamber 2. The port 24 of the conduit 23 is positioned within the chamber 2 to be closed by an elastic abutment member 25 mounted on the lower surface of the piston 8 when the apparatus is in its fully extended condition. The position of the port 24 and the shape of the abutment member 25 are such that venting of air is possible whenever the apparatus is expanding during normal operations. However, during repair or maintenance work, for instance during a tire change or the like, the port 24 is sealed by the abutment 25 to prevent venting of air.

In the apparatus in accordance with the invention, spring forces and absorption forces are inseparable. The unit is always mounted under a predetermined compressive spring bias. To provide for good acoustic insulation between the apparatus and a mass supported by it, the mounting bracket 11 comprises a soft cushion of large surface area. For instance, the chassis or frame of an automobile may be supported on a resilient ring 27 by way of a substantially semi-spherical bulge 13.

As may be seen in FIGS. 2 and 4, there are provided between the conduit 23 and the absorption chamber 2 an intake valve 35 and an exhaust valve 36 connected in series. These valves serve to regulate the air pressure within the apparatus at varying load conditions, even if the apparatus has a limited stroke only or is subjected to a large load. Air is admitted to the chamber through the inner check valve 35 which is provided with a relatively weak return spring 37.

Venting of air takes place by way of a check valve 36 provided with a relatively strong return spring 38. Hence, the check valve 36 permits venting of air only up to a differential pressure determined by the bias of the spring 38.

In the embodiment shown in FIG. 2, the pneumatic pressure within the chamber 2 may act upon a relatively large surface of the moveable valve plunger 36. However, the surface of the plunger 35 on which air admitted to the chamber 2 may act is relatively small. Accordingly, return spring 38 has to be substantially stronger than return spring 37. In accordance with the embodiment of FIG. 4, the arrangement of the valve is such that the surface of the plunger 36' subjected to pressure within chamber 2 is relatively small whereas the surface of plunger 35 subjected to air admitted to the chamber 2 is relatively large. For this reason, the return springs 37' and 38' may be of a substantially identical force.

As mentioned above, there is provided on the sleeve 17 a pressure level switch 20. This switch 20 is actuated by engagement with the resilient bellows 14. As the bellows 14 rolls along the sleeve 17 within the range of a switch contact, the switch is closed and a signal is released to an appropriate electronic control circuit indicative of the level of pressure within the apparatus. Too high a pressure may be indicated by 0 and too low a pressure may be indicated by 1. If such signals are provided for both wheels of a common axle, the following control logic is possible:

| Control Function | Switch Position | |
|---|---|---|
| | left wheel | right wheel |
| Admit air | 1 | 1 |
| Admit air | 1 | 0 |
| Admit air | 0 | 1 |
| Vent air | 0 | 0 |

Such a control logic is made possible also by way of two contacts arranged one below the other.

An electrically insulating strip of foil 52 may be attached to the electrically conductive sleeve 17 or to a switch bar 50 mounted thereon. It may also be attached to a contact strip with a plurality of cut-outs such as 53 and 54. The insulating foil is then covered by a conductive tongue 51 made of a material possessing a high degree of flexibility. The tongue 51 has to be insulated from the sleeve 17. Preferably, the tongue 51 has a large surface area and may be covered by a protective layer of polyurethane, for instance. Thus, if the rolling bellows 14 presses against the tongue 51 in the area of a cut-out 53 it becomes conductive with respect to the sleeve 17 or to the contact strip 50. This, in turn, releases a signal leading to the admission of air into the apparatus. By providing a plurality of cut-outs 53, 54 in superposed relation signals indicating different levels of pressure may be generated. To maintain the distance between the contact spots as close as possible, the spots may be arranged in an echelon fashion.

The alternate pneumatic spring-loaded damping or shock absorbing apparatus in accordance with FIG. 7 is describe only to the extent that it differs from the embodiment of FIG. 1. Elements having functions similar to elements shown in FIG. 1 have been identified by the same reference characters. The apparatus in accordance with FIG. 7 is mounted in an inverse manner from that of the device of FIG. 1. That is to say, the resilient chamber 1 is positioned on top and the rolling bellows 14 is supported by the chassis of an automotive vehicle, for instance.

The embodiment in accordance with FIG. 7 is provided with a hollow piston rod 9' within which there is provided a tubular section 23A which serves as an air intake for the absorption chamber 2. The tubular section 23A communicates with a further tubular section 24A functioning as a venting duct 24' rigidly mounted within the piston 8'.

The piston 8' is provided with an annular abutment 25' which controls the intake of the venting conduit 24' within the chamber 2. The abutment 25' may be made of an elastomeric material. If during expansion of the apparatus the abutment 25' engages the closure member 7', an undercut surface area 25A of the abutment 25' positioned to extend over the port of the venting duct 24' is pressed against the port to seal it. Further venting of the apparatus is thus prevented.

As will be appreciated by those skilled in the art, the invention by very simple means provides for preventing total pneumatic evacuation of a pneumatic spring-loaded damping or shock absorbing apparatus.

What is claimed is:

1. A pneumatic spring loaded damping apparatus, comprising:
   a substantially cylindrical housing including first and second closure means for closing opposite ends of said housing;
   first mounting means adjacent one of said first and second closure means for mounting said apparatus;
   a piston mounted within said housing for reciprocating movement between said first and second closure means and for dividing said housing into first and second absorption chambers, said chambers having complementarily increasable and decreasable volumes as a function of movement of said piston;
   throttle means provided within said piston for bidirectional exchange of pressure between said first and second absorption chambers;
   a piston rod connected to said piston and extending through one of said first and second absorption chambers and one of said first and second closure means, and provided at its free end with second mounting means;
   resilient bellows connected to said housing and said piston rod for forming a resilient sealed chamber therebetween;
   conduit means having port means leading into the interior of one of said first and second absorption chambers for venting and pressurizing thereof; and
   means cooperating with said piston for closing said port means as a function of said piston moving toward one of said first and second closure means.

2. The apparatus of claim 1, wherein said port means is positioned in one of said first and second closure means and wherein said means cooperating with said piston comprises an annular abutment member for closing said port means during movement of said piston toward the said one of said first and second closure means.

3. The apparatus of claim 2, wherein the conduit is provided within the piston and wherein an air duct is provided within the piston rod for communicating with the conduit.

4. The apparatus of claim 3, wherein the conduit and the duct comprise tubular sections provided within the piston and the piston rod, respectively.

5. The apparatus of claim 2, wherein movement of said piston between said first and second closure means respectively moves said apparatus into compressed and expanded states, and wherein said port means leads into the one of said first and second absorption chambers the volume of which is increased in the compressed state of the apparatus.

6. The apparatus of claim 5, wherein said conduit of said port means comprises an air intake valve opening automatically during compression of said apparatus.

7. The apparatus of claim 6, wherein said conduit further comprises an exhaust valve serially arranged with said intake valve and adapted automatically to open during expansion of said apparatus.

8. The apparatus of claim 7, including pressure level switch means provided in a sleeve mounted on said piston rod and responsive to movement of the bellows connected thereto for generating signals for controlling air intake and venting through said conduit.

9. The apparatus of claim 8, wherein said pressure level switch means comprises an electrically conductive bar covered by a perforated strip of insulating material and an electrically conductive flexible member superposed on said strip and engageable by the bellows during movement thereof for contacting said bar through said perforated strip.

10. The apparatus of claim 9, wherein said perforated strip comprises cutouts arranged in a predetermined pattern to provided varying degrees of engagement with said bellows during movement thereof, said degrees of engagement being related to the pneumatic pressure within said apparatus.

11. The apparatus of claim 7, wherein said intake valve and said exhaust valve comprise check valves.

12. The apparatus of claim 11, wherein said check valve have substantially identical reactive force.

* * * * *